United States Patent [19]

Tagaya et al.

[11] Patent Number: 4,794,171

[45] Date of Patent: Dec. 27, 1988

[54] CALCIUM-PHOSPHATE TYPE HYDROXYAPATITE AND PROCESS FOR PRODUCING SAME

[75] Inventors: Nobuaki Tagaya, Kawagoe; Hideyuki Kuwahara, Oi; Takao Hashimoto, Oi; Noriko Komatsu, Oi; Keiko Fukamachi, Mitaka; Tsugio Maeshima, Saitama, all of Japan

[73] Assignee: Toa Nenryo Kogyo Kabushiki Kaisha, Tokyo, Japan

[21] Appl. No.: 909,981

[22] Filed: Sep. 22, 1986

[30] Foreign Application Priority Data

Sep. 23, 1985 [JP] Japan .................. 60-209561

[51] Int. Cl.$^4$ ............................................. C01B 25/32
[52] U.S. Cl. ........................... 530/417; 210/681; 423/308; 423/309; 423/311; 433/201.1; 435/176; 435/815; 501/1; 502/439; 530/344; 530/412; 530/416
[58] Field of Search .................. 423/308, 309, 311; 530/344, 417, 412, 416

[56] References Cited

U.S. PATENT DOCUMENTS

4,497,075  2/1985  Niwa et al. .................. 423/308

Primary Examiner—John Doll
Assistant Examiner—Wayne A. Langel
Attorney, Agent, or Firm—Seidel, Gonda Lavorgna & Monaco

[57] ABSTRACT

A calcium-phosphate type hydroxyapatite which belongs to a series of hexagonal systems has unit lattice constants of 9.58±0.08 Å for the a axis and 7.00±0.05 Å for the c axis. Its Ca/P ratio is in the range of 1.50 to 1.90. It is for use as a column packing material for chromatographic separation of biopolymers. The hydroxyapatite is produced by firing it in the form of a gel or powder at a temperature of 400° to 700° C. As a gel the hydroxyapatite takes the form of a suspension or slurry. A powder is prepared by removing moisture from the hydroxyapatite in the gel form and then drying. Either gel or powder is fired by heating in the presence of oxygen or air at 500° to 600°0 C.

10 Claims, 5 Drawing Sheets

CALCIUM-PHOSPHATE TYPE HYDROXYAPATITE AND PROCESS FOR PRODUCING SAME

BACKGROUND OF THE INVENTION

This invention relates to a calcium-phosphate type hydroxyapatite and a process for producing the same.

More particularly, the invention is concerned with a novel calcium-phosphate type hydroxyapatite having specific crystal properties and useful as a column packing material for separation of biopolymers, as a material for biomedical use such as bone regeneration, and as a bioceramic material, catalyst support, fluorescent material, electronic material, inorganic ion exchanger, and genetic engineering material. The invention also concerns a process for producing the above hydroxyapatite.

The term apatite-structure compounds is generically used to denote a large group of compounds having a common formula $M_{10}(ZO_4)_6 \cdot X_2$ where M represents a metallic atom of Ca, Ba, Sn, Mg, Na, K, Pb, Cd, Zn, Ni, Fe, Al or the like, $ZO_4$ represents an acid radical, such as $PO_4$, $AsO_4$, $VO_4$, $SO_4$, or $SiO_4$, and X represents an OH or F atom (group). The present invention is directed to a calcium phosphate compound of the above general formula in which M is essentially Ca, $ZO_4$ essentially $PO_4$, and X essentially OH. The following description will, therefore, be centered around this particular compound.

The calcium-phosphate type hydroxyapatite, $Ca_{10}(PO_4)_6(OH)_2$ (hereinafter termed "hydroxyapatite" unless otherwise noted), has attracted growing attraction in recent years as a material for biomedical use, typically for artificial teeth and bones. This is because it closely resembles in composition to the inorganic ingredients of the teeth and bones of vertebrate animals and exhibits good affinity for living bodies. The affinity for living organisms has rendered it useful as a packing material to be filled in columns for chromatographic separation of biopolymers, for example, proteins, enzymes, and nucleic acids.

Conventionally, such hydroxyapatites are synthesized in most cases by (1) wet synthesis involving an aqueous solution reaction in which a water-soluble calcium salt and phosphate are allowed to react in aqueous solution, (2) dry synthesis involving a high-temperature solid-phase reaction in which calcium phosphate and calcium carbonate are allowed to react in the presence of water vapor at 900° to 1400° C., or (3) hydrothermal synthesis involving a reaction under high-temperature, high-pressure steam in which calcium hydrogenphosphate is hydrolyzed, for example, at 200° C. and at 15 atm.

In addition to these, a new synthetic process has been proposed, for example, by Patent Application Publication No. 500447/1980.

The hydroxyapatites obtained in the foregoing processes have a crystal structure belonging to the hexagonal system, with a space group of $P6_3/m$. Their unit lattice constants are 9.432 Å for the a axis and 6.881 Å for the c axis. [M. I. Kay & R. A. Young: Nature, 204, p. 1050 (Dec. 12, 1964)].

We have found, as a result of extensive studies and experiments, that the hydroxyapatites having the crystal properties as above are not capable of constantly achieving adequate separability and selectivity when used as column packing materials for chromatographic separation, especially, of biopolymers.

Therefore, it is an object of the present invention to provide a novel hydroxyapatite having unique crystal properties, or specific unit lattice constants, and useful as a material for biomedical applications as artificial teeth and bones, as a bioceramic material, catalyst support, fluorescent material, electronic material, inorganic ion exchanger, genetic engineering material and so forth, and also a process for producing the same.

Another object of the invention is, in view of the fact that the hydroxyapatites proposed thus far have had inadequate separability and selectivity when used as column packing materials for chromatographic separation of biopolymers, to provide a novel calcium-phosphate type apatite for chromatographic separation having unique crystal properties and excels in separability and selectivity.

SUMMARY OF THE INVENTION

Our diversified investigations about the crystal properties of apatite-structure compounds have led to the discovery of a hydroxyapatite having a novel crystal structure with the unit lattice constants as determined by the X-ray diffraction (XRD) dissimilar to those of the apatite-structure compounds known in the art. The particular compound has been found extremely useful, as noted above, as a material for biomedical applications such as artificial teeth and bones and as a bioceramic material, catalyst support, fluorescent material, electronic material, inorganic ion exchanger, and genetic engineering material, especially as a column packing material for chromatographic separation of biopolymers. The present invention has now been perfected on the basis of these discoveries.

The invention thus provides a hydroxyapatite that crystallizes in the hexagonal system and is characterized by a space group of $P6_3/m$ and unit lattice constants of 9.58±0.08 Å for the a axis and 7.00±0.05 Å for the c axis. Also, according to the invention, a novel calcium-phosphate type apatite for chromatographic separation with particularly outstanding separability and selectivity is provided.

DETAILED DESCRIPTION OF THE INVENTION

As used herein, the term "unit lattice" means a unit cell as a minimum repeating unit of crystal in which atoms, atomic groups, and molecules are regularly arranged in three-dimensional space. The geometric symmetry of the unit cells is denoted by the crystal system and space group, and the size of the unit cells by the lattice constants. The unit cell of apatite-structure compounds is represented by a hexagonal lattice, for example, with a $Ca^{2+}$, $PO_4^{3-}$, or $OH^-$ arrangement therein.

The unit lattice constants of the already disclosed apatite-structure compounds, for example, of the calcium-phosphate type hydroxyapatite, are 9.432 Å for the a axis and 6.881 Å for the c axis.

The hydroxyapatite according to the present invention, by contrast, has unit lattice constants of 9.58±0.08 Å for the a axis and 7.00±0.05 Å for the c axis. Thus, the hydroxyapatite of the structure according to the invention is utterly dissimilar in crystal properties from those of the prior art and is a novel one not known in the art yet.

The unit lattice constants can be determined by the X-ray diffraction technique. To be more concrete, the angles of diffraction (Bragg angles) according to the powder X-ray diffraction are measured. The diffraction angles can be obtained from the X-ray diffraction pattern recorded on a chart by an X-ray diffraction apparatus equipped with a diffractometer (using CuKα X-rays). Also, from the Bragg equation $\lambda = 2a \sin\theta$ (where $\lambda$ is the wavelength of the CuKα rays, 1.54184 Å) the lattice spacings in angstroms, d (Å), can be found. The crystal system of the hydroxyapatite is hexagonal, and Miller indices (hkl) are given for each lattice spacing d (Å), as set forth in the powder X-ray diffraction file, JCPDS (Joint Committee on Powder Diffraction Standard) 9-432. The lattice spacing d (Å) is expressed, from the lattice constants a and c and from Miller indices (hkl), as formulated below:

$$d = \frac{1}{\sqrt{(4/3a^2)(h^2 + k^2 + hk) + (l^2/C^2)}}$$

Using the Bragg equation, it is written as:

$$\sin^2\theta = \frac{1}{3}\left(\frac{\lambda}{a}\right)^2 (h^2 + k^2 + hk) + \left(\frac{\lambda}{2C}\right)^2 l^2$$

The unit lattice constants a and b of the hydroxyapatite according to the invention are found from the theoretical formula of the hexagonal system using the Bragg angles of the individual diffracted lines obtained by the X-ray diffractometry and the known Miller indices. The most probable values and error ranges of the unit lattice constants a and c are determined by the method of least squares. Table 1 shows the lattice spacings, d (Å), obtained by the X-ray diffraction of the hydroxyapatite of the invention.

The hydroxyapatite of the invention having the unit lattice constants of 9.58±0.08 Å for the a axis and 7.00±0.05 Å for the c axis is useful, for example, as a bioceramic material, catalyst support, fluorescent material, electronic material, inorganic ion exchanger and so forth. It exhibits particularly advantageous performance in the separation of biopolymers, for example, of proteins. When the unit lattice constants of the apatite are not within the ranges specified above, the separation performance is seriously low.

The grounds on which the hydroxyapatite of the invention having the unit lattice constants (a and c) within the specific ranges functions advantageously in the separation of biopolymers in particular are yet to be clarified. However, it may well be said that, ordinarily in the separation of a biopolymer, for example, of a nucleic acid such as DNA or of a protein, an important role is played by the interactions between the absorption points (adsorption sites) present in the hydroxyapatite substrate and the phosphoryl groups on the molecules of the nucleic acid or between the adsorption points and the amino and carboxyl groups of the protein.

It is to be noted here that on the surface of the hydroxyapatite there appear mainly two different planes; one parallel to the plane ac or bc of the crystal lattice (and called the plane b or a, respectively) which are equivalent crystallographically, and a plane parallel to the plane ab (and called the plane c). On the plane a or b of the crystal are arranged adsorption points (called the adsorption points c) each constituted by two positively charged calcium atoms, and on the plane c of the crystal, adsorption points (called the points P) each constituted by six oxygen atoms derived from negatively charged phosphoryl ions. Located in the crystal, these points are arranged regularly and exist in a constant number per unit area. It follows that where the unit lattice constants a and c (values) are different, the distances between the adsorption points c and between the adsorption points P differ too.

As noted above, for the chromatographic separation of biopolymers the interactions between the adsorption points of the hydroxyapatite and the various functional groups of the biopolymers are important, and it is obvious that the distances between the adsorption points c and between the points P, or between those adsorption points influence the interactions such as adsorption or desorption of the biopolymers. Appropriate distances must be provided between these adsorption points. It is presumed that the hydroxyapatite having the unit lattice constants conforming to the present invention satisfies the foregoing conditions and performs excellently in the biopolymer separation.

The hydroxyapatite of the invention having such unique crystal properties is desired to have such composition that the atomic ratio of Ca to P, or Ca/P, ranges from 1.5 to 1.9.

The hydroxyapatite of the invention useful as a column packing material for chromatographic separation is also characterized by a specific pyridine adsorption, in addition to the specific unit lattice constants as defined above. Our investigations have revealed that a hydroxyapatite capable of adsorbing 0.003 to 0.01 mmol of pyridine per gram performs excellently in the separation of biopolymers. This is presumably ascribable to the control of the acid amount, particularly of the functional group $OH^-$, among the functional groups $OH^-$, $Ca^{2+}$, and $PO_4^{3-}$ that play vital roles in the interactions between the hydroxyapatite substrate and the phosphoryl groups on the nucleic acid or between the substrate and the amino and carboxyl groups of the protein as described above.

The pyridine adsorption is expressed principally in terms of the solid acid amount based on the above-mentioned functional groups. If the pyridine adsorption is less than 0.003 mmol/g, the hydroxyapatite has a too low protein separation capability for practical service. If the pyridine adsorption exceeds 0.01 mmol/g, the separation performance is again inadequate.

The third factor that characterizes the hydroxyapatite of the invention is that it is a crystallite aggregate consisting chiefly of tiny acicular crystals. The dimensions are 100 to 500 Å wide and 500 to 3000 Å long. The acicular crystallites are naturally easy to granulate into spherulites. The crystallite aggregates that usually take the form of spherulites have a mean particle diameter of 0.5 to 50 μm, preferably 1 to 10 μm. The granulation into spherulites brings with it the advantages of added mechanical strength and more uniform packing of the bed inside the separation column.

Examples of the proteins capable of being separated by chromatography are immunoglobulin G, transferrin, myeloma immunoglobulin D, serum albumin, and ovalbumin.

The process for producing the hydroxyapatite in accordance with the present invention will now be described.

The process of the invention may be carried out by firing the hydroxyapatite in the form of a gel or powder, obtained by the usual wet process involving a solution reaction, dry process involving a high-temperature, solid-phase reaction, or hydrothermal process involving hydrolysis as briefly outlined above, at a temperature of 400° to 700° C. Preferably, the process of the invention comprises granulating the hydroxyapatite in the form of a gel and then firing the granular hydroxyapatite at 400° to 700° C.

We have extensively studied about the relationship between the crystal properties of apatite-structure compounds and the firing temperatures. As a result, it has been found that the unit lattice constants of the apatite-structure compounds increase with the rise of the firing temperature, to a maximum at at point short of about 600° C. and then turn for decreases with the further rise of the temperature beyond that point. The present invention is predicated upon this discovery.

The expression "the hydroxyapatite in the form of a gel" as used herein means a suspension or slurry in which acicular crystallites of hydroxyapatite are suspended or slurried with water or an aqueous solution containing the ions of calcium, phosphoric acid or the like. It can be prepared by any of the afore-described processes for hydroxyapatite synthesis. Also, a hydroxyapatite in the form of a gel may be obtained by dispersing or mixing powdered crystallites in an aqueous solution.

By the expression "hydroxyapatite in the form of a powder" is meant a product obtained by removing water from the hydroxyapatite in the form of a gel and then drying it at about 80° to about 130° C.

In the process of the invention, the firing is carried out by heating a hydroxyapatite in the form of a gel or powder in a heating zone to a predetermined temperature and then maintaining the same temperature level. The firing temperature is in the range of 400° to 700° C., preferably in the range of 500° to 600° C. The firing time is not critical but is usually 0.1 to 20 hours, preferably 1 to 3 hours. Desirably, the firing is carried out in the presence of oxygen or air. The drying conditions are not specially limited but heating at 80° to 120° C. for 0.1 to 10 hours usually gives good result.

When the hydroxyapatite according to the invention is to be utilized as a column packing material for chromatographic separation, it is advisable first to granulate a hydroxyapatite in the form of a gel and then fire the granulated hydroxyapatite in the same manner as described above.

A desirable method of granulating the gel of hydroxyapatite is by spray drying. The spray drying consists of spraying a hydroxyapatite suspension or slurry into a high-temperature air stream and thereby drying it up instantaneously. As for the conditions for spray drying, the suspension or slurry concentration is 0.1 to 20% by weight, preferably 1 to 10% by weight, and the temperature of the high-temperature air stream is 100° to 200° C., preferably 110° to 170° C. The spray nozzle configurations, air quantity, and other conditions may be suitably chosen as desired. Experiments showed that the granulation yielded products with particle diameters controlled within the range of about 0.5 to about 50 μm, more particularly within the range of about 1 to about 20 μm. It was found possible that judicious granulation could afford spherules with diameters in an even narrower range of about 1 to about 10 μm.

The hydroxyapatite thus obtained by firing the starting apatite in the form of a gel or powder in the manner described is a compound unknown in the art, novel with specific unit lattice constants and properties as follows:

| | |
|---|---|
| Particle diameter, in μm | 0.5–50 |
| Ca/P ratio | 1.5–1.9 |
| Particle shape | spherical (acicular-crystallite aggregates) |
| Pyridine adsorption, in mmol/g | 0.003–0.01 |

Next, the present invention is illustrated by the following examples.

EXAMPLE 1

A one-liter, three-necked flask was charged with a suspension of calcium hydroxide (consisting of 15.6 g 95% Ca(OH)$_2$ and 400 g distilled water). With the injection of nitrogen gas and with vigorous stirring, an aqueous solution of phosphoric acid (consisting of 13.8 g 85% H$_3$PO$_4$ and 400 g distilled water) was slowly added. Following the conclusion of the addition, the pH was adjusted to 8.2 by the further addition of the aqueous phosphoric acid. The mixture was set in position on an oil bath and held at 90° C. for about 18 hours. A white crystallite-containing product, or a hydroxyapatite in the form of a gel, was obtained.

After cooling, part of the product was passed through a spray drier to obtain spherical granules, or crystallite aggregates, about 1 to about 10 μm in diameter.

The product was further subjected to drying at 100° C. and firing at 580° C. to prepare granules for separation columns. The lattice spacings found by X-ray diffraction of the granules are given in Table 1. The property values of the granules were as follows:

(1) Unit lattice constants determined by X-ray diffraction:
   a=9.58 Å
   c=7.01 Å
(2) Pyridine adsorption=0.0056 mmol/g
(3) Ca/P ratio=1.67

X-ray diffraction was carried out using the apparatus manufactured by Rigaku Denki Co., Model "RAD-rD". The measurement conditions employed were as follows:

Output=40 kV, 30 mA CuKα
DS/RS/SS=1/6° C./0.15 mm/1/6° C.
Preset time=0.1 sec.
Step width=1/100

TABLE 1

| Miller indices h · k · l | Lattice spacing d (Å) | | | | |
|---|---|---|---|---|---|
| | Ex. 1 | Ex. 2 | Ex. 3 | Comp. Ex. 1 | Comp. Ex. 2 |
| 002 | 3.503 | 3.480 | 3.495 | 3.440 | 3.461 |
| 102 | 3.227 | 3.206 | 3.219 | 3.169 | 3.188 |
| 210 | 3.137 | 3.113 | 3.126 | 3.079 | 3.098 |
| 211 | 2.863 | 2.842 | 2.854 | 2.811 | 3.828 |
| 112 | 2.828 | 2.808 | 2.820 | 2.777 | 2.793 |
| 300 | 2.767 | 2.745 | 2.757 | 2.716 | 2.732 |
| 202 | 2.677 | 2.658 | 2.669 | 2.628 | 2.644 |

TABLE 1-continued

| Miller indices h·k·l | Lattice spacing d (Å) | | | | |
|---|---|---|---|---|---|
| | Ex. 1 | Ex. 2 | Ex. 3 | Comp. Ex. 1 | Comp. Ex. 2 |
| 301 | 2.573 | 2.554 | 2.565 | 2.526 | 2.541 |
| 212 | 2.337 | 2.320 | 2.330 | 2.294 | 2.308 |
| 310 | 2.302 | 2.284 | 2.294 | 2.259 | 2.273 |
| 222 | 1.778 | 1.963 | 1.971 | 1.941 | 1.953 |
| 312 | 1.924 | 1.910 | 1.918 | 1.889 | 1.900 |
| 213 | 1.873 | 1.860 | 1.868 | 1.839 | 1.850 |

Pyridine adsorption was determined in the following way.

A granulated hydroxyapatite 1 to 10 μm in particle diameter was lightly compacted by a pressure compactor. The compact was ground in an agate mortar to a finer size of 30 to 100 meshes. Of the ground apatite, 0.075 g was exactly weighed and filled into a tubular sample tube, and dried in a nitrogen atmosphere at 100° C. Meanwhile, a bubbler containing pyridine was immersed in a water bath kept at a constant temperature of 15.5° C., and bubbling with nitrogen was carried out to allow the hydroxyapatite filled in the reactor to adsorb the pyridine at 100° C. for 15 minutes. Thereafter, the temperature was gradually increased up to 200° C. in a nitrogen stream, and the temperature was maintained to cause desorption of the physically adsorbed content. By gas chromatography of the hydrogen ion detection type, it was confirmed that no more desorption of pyridine was detectable. Next, the temperature was increased at a rate of 5° C./minute from 200° C. up to 950° C. The quantity of pyridine desorbed thereby was determined by the gas chromatography. This quantity of pyridine eliminated was measured as the pyridine adsorption.

EXAMPLE 2

The same material as used in Example 1 was employed to prepare granules under the same reaction conditions. The granular product was dried at 100° C. and then fired at 400° C. for 3 hours. The lattice spacings of the fired granules as measured by X-ray diffraction were as shown in Table 1.

The property values of the product were as follows:
(1) Unit lattice constants:
 $a = 9.51$ Å
 $c = 6.96$ Å
(2) Pyridine adsorption = 0.0092 mmol/g
(3) Ca/P ratio = 1.67

EXAMPLE 3

The same material and the same reaction conditions as used in Example 1 were employed to prepare granules. The product was dried at 100° C. and fired at 700° C. for 3 hours. The lattice spacings of the granules as measured by X-ray diffraction are given in Table 1.

The property values were as follows:
(1) Unit lattice constants:
 $a = 9.55$ Å
 $c = 6.99$ Å
(2) Pyridine adsorption = 0.0038 mmol/g
(3) Ca/P ratio = 1.67

COMPARATIVE EXAMPLE 1

A one-liter, three-necked flask was charged with a suspension of calcium hydroxide (consisting of 15.6 g 95% Ca(OH)$_2$ and 400 g water). With the introduction of nitrogen gas and with vigorous stirring, an aqueous solution of phosphoric acid (consisting of 13.8 g 85% H$_3$PO$_4$ and 400 g water) was slowly added. Following the conclusion of the addition, the aqueous phosphoric acid was further added to adjust the pH to 8.2. The mixture was set in position on an oil bath and held at 90° C. for about 18 hours. The product was cooled and part of it was passed through a spray drier to obtain granules 1 to 10 μm in diameter. The granular product was dried at 100° C. and used as a packing material for chromatographic separation. The lattice spacings of the granules measured by X-ray diffraction were as shown in Table 1.

The property values were as follows:
(1) Unit lattice constants:
 $a = 9.41$ Å
 $c = 6.88$ Å
(2) Pyridine adsorption = 0.0106 mmol/g
(3) Ca/P ratio = 1.67

COMPARATIVE EXAMPLE 2

The same material as used in Example 1 was treated under the same reaction conditions to give spherical granules 1 to 10 μm in diameter. The granular product was dried at 100° C. and then fired in a muffle furnace, in the presence of air, at 1100° C. for 3 hours. The lattice spacings of the granules measured by X-ray diffraction were as given in Table 1.

The physical properties were as follows:
(1) Unit lattice constants:
 $a = 0.46$ Å
 $c = 6.92$ Å
(2) Pyridine adsorption = 0 mmol/g
(3) Ca/P ratio = 1.67

REFERENCE EXAMPLE

Figure 1:
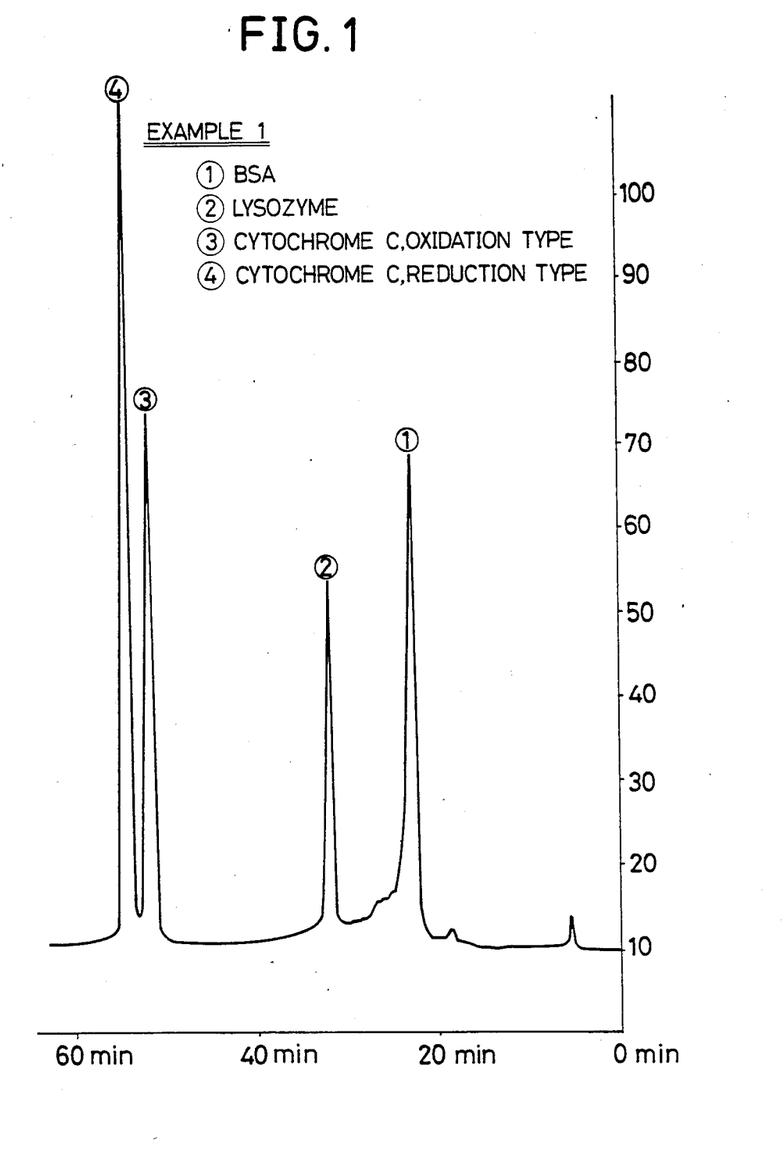
FIGS. 1 through 5 are exemplary chromatograms obtained by the use of hydroxyapatites prepared in accordance with the invention and of hydroxyapatites known in the art, both as column packing materials for liquid chromatographic separation of proteins.
Figure 2:
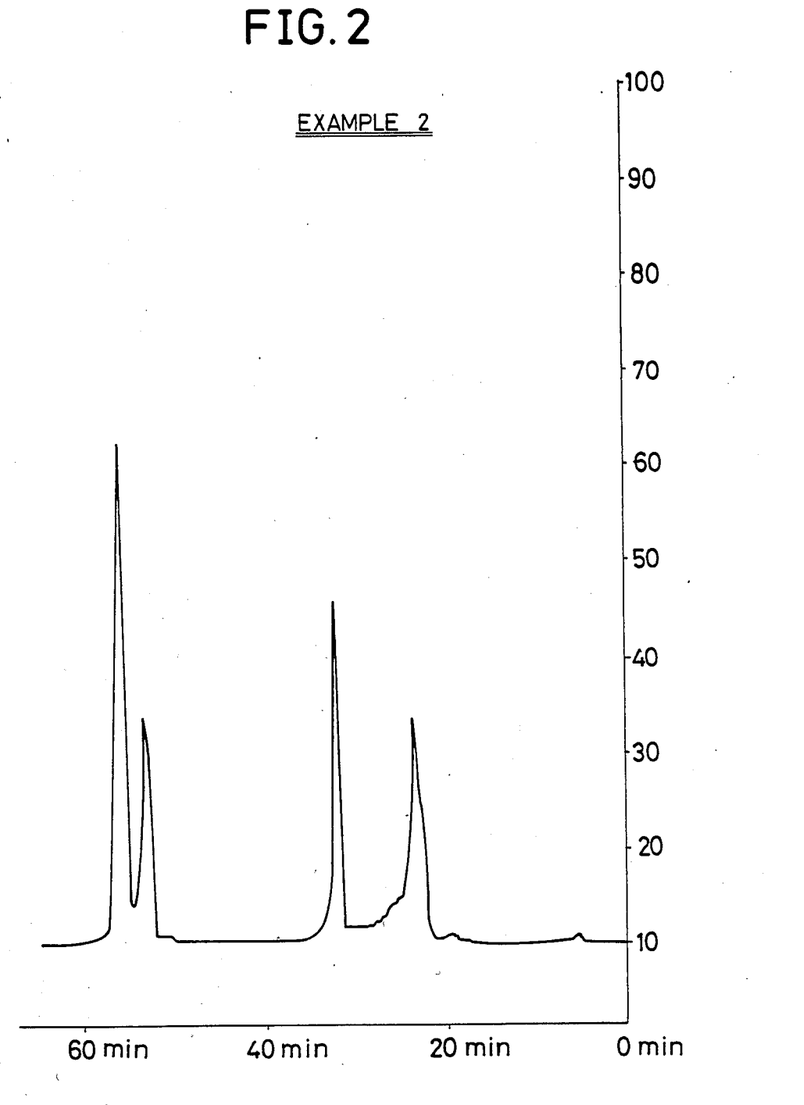
Figure 3:
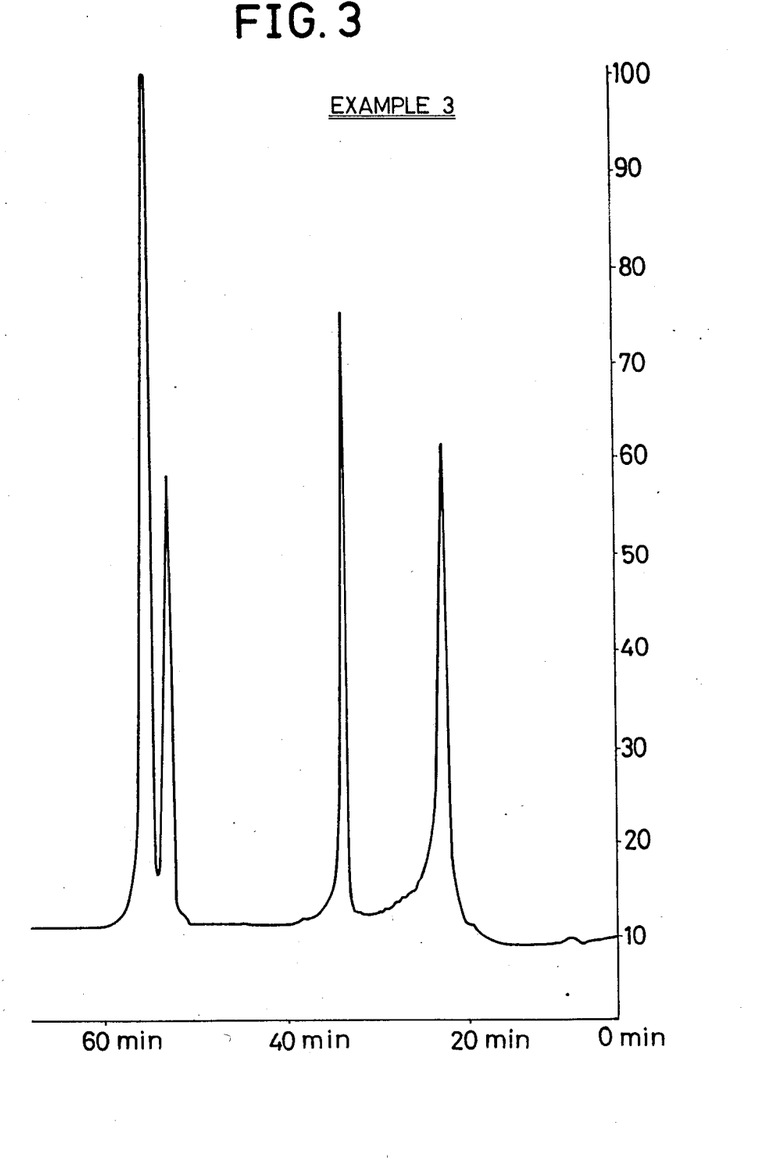
Figure 4:
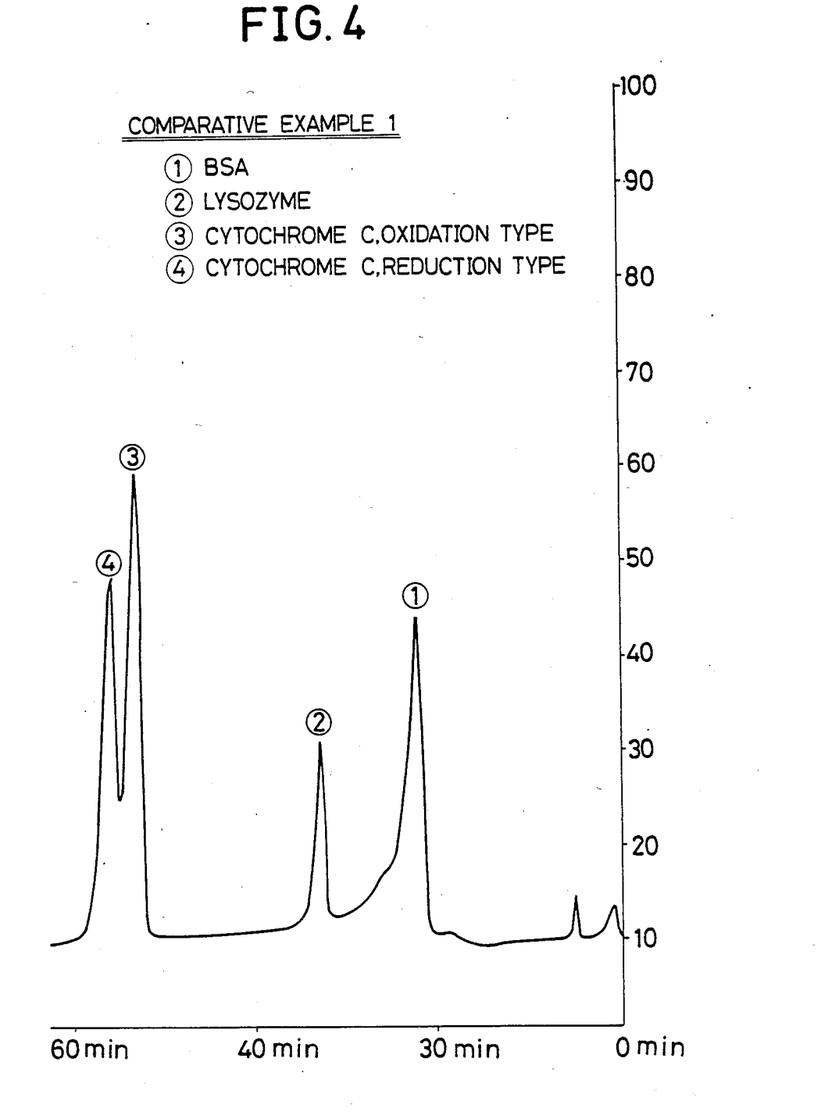
Figure 5:
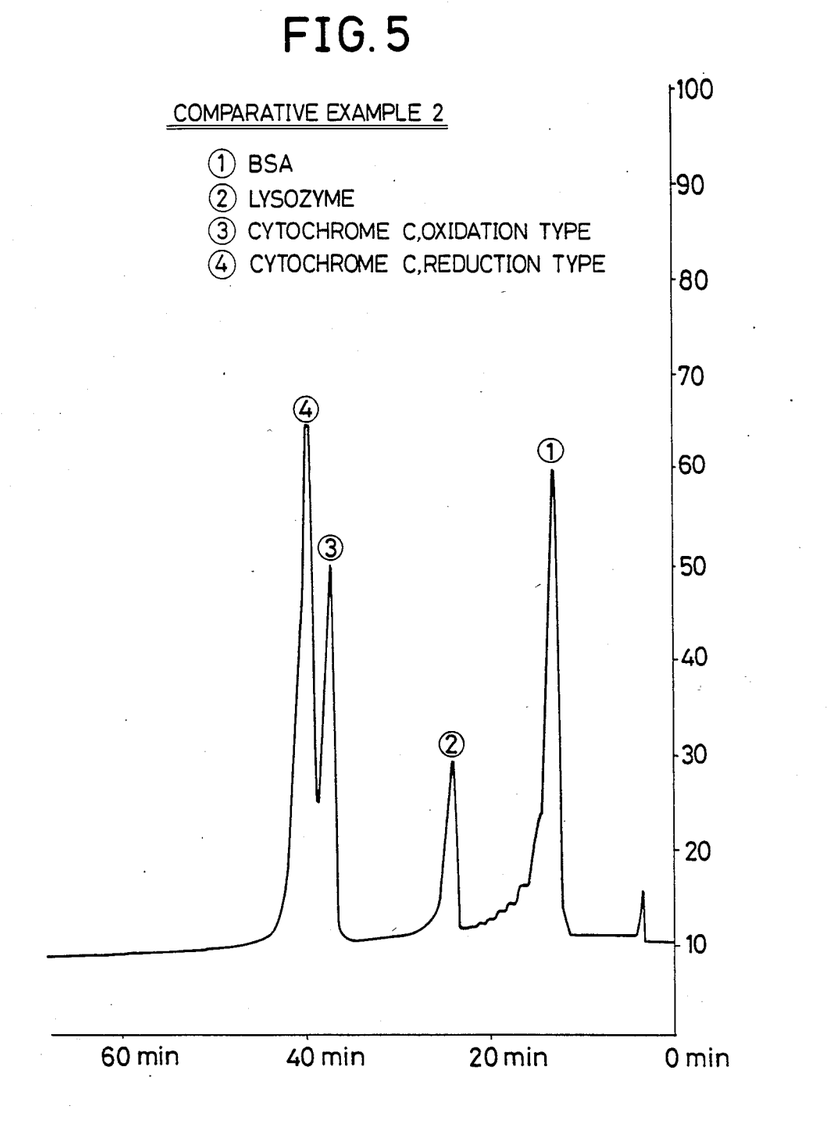

The hydroxyapatites obtained in Examples 1 to 3 and Comparative Examples 1 and 2 were used in separating samples of a mixture of cytochrome C, lysozyme, and bovine serum albumin (BSA). The conditions employed for the chromatographic separating operations were as follows:

Liquid chromatograph:
 Model "LC244" mfd. by Waters Co.
Solvent (gradient solution):
 Aqueous solution of sodium phosphate (pH 6.8)
 0.01–0.3 mol/hr gradient
Flow rate:
 0.8 ml/min
Sample quantity:
 100 μl each (50 μl where the hydroxyapatite of Example 2 was used)
Detector:
 Model "UVDEC-100-III"
 mfd. by Japan Spectroscopic Co.
 Detection wavelength = 280 nm
Chromatogram record:
 Recording chart speed = 2.5 mm/min The results are graphically shown in FIGS. 1 to 5. It can be clearly seen that the hydroxyapatites prepared in accordance with the invention have by far the greater separation capabilities than the known hydroxyapatites.

Numbers of theoretical plates were found so as to determine the separation capabilities in the separation of cytochrome C. The results obtained are shown in Table 2. For the purposes of the invention the term "number of theoretical plates" is calculated, on the basis of the resolution time (tR) in chromatography and the halfwidth of the chromatograph, from the following formula:

$$N \text{ (No. of theoretical plates)} = 16(tR/\omega)^2.$$

TABLE 2

|  | Example | | | Comparative Example | |
|---|---|---|---|---|---|
|  | 1 | 2 | 3 | 1 | 2 |
| Ca/P ratio |  |  | 1.67 |  |  |
| Lattice spacing constant |  |  |  |  |  |
| a (Å) | 9.58 | 9.51 | 9.55 | 9.41 | 9.46 |
| c (Å) | 7.01 | 6.96 | 6.99 | 6.88 | 6.92 |
| Pyridine adsorption (mmol/g) | 0.056 | 0.0092 | 0.0038 | 0.0106 | 0 |
| No. of theoretical plates for separation of cytochrome C | (14,000 20,000) | 13,000 | 11,000 | 3,800 | 2,000 |

The present invention provides a novel apatite-structure compound having unique crystal properties and extremely useful as a material for biomedical applications such as artificial teeth and bones, as a bioceramic material, catalyst support, fluorescent material, electronic material, inorganic ion exchanger, genetic engineering material and so forth, and especially as a column packing material for chromatographic separation of biopolymers. The use of the apatite-structure compound of the invention, particularly as a column packing material for chromatographic separation of biopolymers, or proteins among others, permits marked improvements in the separabilities.

What is claimed is:

1. A calcium-phosphate type hydroxyapatite characterized by a hexagonal unit lattice having unit lattice constants of 9.58±0.08 Å for the a axis and 7.00±0.05 Å for the c axis.

2. A calcium-phosphate type hydroxyapatite according to claim 1 in which the Ca/P ratio of the hydroxyapatite is in the range of 1.50 to 1.90.

3. A calcium-phosphate type hydroxyapatite according to claim 1 prepared by firing a calcium-phosphate type hydroxyapatite comprising acicular crystals at a temperature in the range of 400° C. to 700° C.

4. A process according to claim 3 in which the firing temperature is in the range of 500° C. to 600° C.

5. A process comprising using the calcium-phosphate type hydroxyapatite according to claim 1 as a column packing material for chromatographic separation of biopolymers.

6. A process according to claim 5 in which the hydroxyapatite is in the form of spherulites, each of which is an aggregate mainly of acicular crystallites.

7. A process according to claim 6 in which the spherulites have a mean particle diameter of 0.5 to 50 μm.

8. A process according to claim 7 in which the mean particle diameter of the spherulites is 1 to 10 μm.

9. A process according to claim 5, 6, 7 or 8 in which pyridine adsorption is in the range of 0.003 to 0.01 mmol/g.

10. A process according to claim 5 in which the Ca/P ratio of the hydroxyapatite is in the range of 1.50 to 1.90.

* * * * *